US012688249B2

(12) United States Patent
Monk, IV et al.

(10) Patent No.: US 12,688,249 B2
(45) Date of Patent: Jul. 21, 2026

(54) METHOD AND SYSTEM FOR DETECTING SLOW PAGE LOAD

(71) Applicant: PayPal, Inc., San Jose, CA (US)

(72) Inventors: J. Thomas Monk, IV, Mountain View, CA (US); Hemal Doshi, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/983,739

(22) Filed: Dec. 17, 2024

(65) Prior Publication Data

US 2025/0225194 A1 Jul. 10, 2025

Related U.S. Application Data

(63) Continuation of application No. 18/095,106, filed on Jan. 10, 2023, now Pat. No. 12,189,707, which is a continuation of application No. 16/989,682, filed on Aug. 10, 2020, now Pat. No. 11,550,870, which is a continuation of application No. 15/236,660, filed on
(Continued)

(51) Int. Cl.
| | |
|---|---|
| *G06F 16/957* | (2019.01) |
| *G06F 16/958* | (2019.01) |
| *G06F 40/143* | (2020.01) |
| *G06F 40/197* | (2020.01) |
| *H04L 67/02* | (2022.01) |

(52) U.S. Cl.
CPC ........ *G06F 16/9577* (2019.01); *G06F 16/986* (2019.01); *G06F 40/143* (2020.01); *G06F 40/197* (2020.01); *H04L 67/02* (2013.01)

(58) Field of Classification Search
CPC .............................. G06F 16/9577; H04L 67/02
See application file for complete search history.

(56) References Cited

U.S. PATENT DOCUMENTS

| | | |
|---|---|---|
| 6,992,983 B1 | 1/2006 | Chatterjee |
| 7,673,026 B2 | 3/2010 | Jardin et al. |
| (Continued) | | |

OTHER PUBLICATIONS

Entire Prosecution History of U.S. Appl. No. 12/792,560, titled "Method and System for Detecting Slow Page Load," filed Jun. 2, 2010, 206 pages.

(Continued)

*Primary Examiner* — Esther B. Henderson
(74) *Attorney, Agent, or Firm* — Kowert, Hood, Munyon, Rankin & Goetzel, P.C.; Scott W. Pape; Dean M. Munyon

(57) ABSTRACT

A method and system for detecting slow page load is provided. An example system comprises a page request detector, a time-out module, a time-out monitor, and a lightweight page requestor. The page request detector may be configured to detect a request for a web page. The time-out module may be configured to commence a time-out period in response to a request for a web page. The time-out module cooperates with the time-out monitor that may be configured to determine that rendering of a rich version of the requested web page has not commenced at an expiration of the time-out period. The lightweight page requestor may be configured to cause a lightweight version of the requested page to be provided to the client system when the time-out monitor determines that the rendering of a rich version of the requested web page has not commenced at an expiration of the time-out period.

20 Claims, 7 Drawing Sheets

Related U.S. Application Data

Aug. 15, 2016, now Pat. No. 10,740,426, which is a continuation of application No. 12/792,560, filed on Jun. 2, 2010, now Pat. No. 9,430,581.

(56) References Cited

U.S. PATENT DOCUMENTS

| | | | |
|---|---|---|---|
| 7,899,847 | B2 | 3/2011 | Lau et al. |
| 8,103,742 | B1 | 1/2012 | Green |
| 8,352,627 | B1 | 1/2013 | Mackie |
| 9,076,147 | B2 | 7/2015 | Khoo et al. |
| 9,430,581 | B2 | 8/2016 | Monk et al. |
| 9,614,889 | B2 | 4/2017 | Ehrich et al. |
| 2002/0010780 | A1 | 1/2002 | Wong et al. |
| 2002/0073197 | A1 | 6/2002 | Bhogal et al. |
| 2002/0143933 | A1 | 10/2002 | Hind et al. |
| 2002/0186775 | A1 | 12/2002 | Cordero et al. |
| 2003/0018447 | A1 | 1/2003 | Florschuetz |
| 2003/0128711 | A1 | 7/2003 | Olariu et al. |
| 2004/0107267 | A1 | 6/2004 | Donker et al. |
| 2005/0036512 | A1 | 2/2005 | Loukianov |
| 2006/0111911 | A1 | 5/2006 | Morford |
| 2006/0253454 | A1 | 11/2006 | Coppola et al. |
| 2007/0038718 | A1 | 2/2007 | Khoo et al. |
| 2007/0088805 | A1* | 4/2007 | Cyster .................. G06F 16/957 707/E17.119 |
| 2007/0294646 | A1 | 12/2007 | Timmons |
| 2008/0043684 | A1 | 2/2008 | Hovey |
| 2009/0307367 | A1 | 12/2009 | Gigliotti |
| 2011/0208801 | A1* | 8/2011 | Thorkelsson ......... H04L 67/567 715/764 |
| 2011/0302234 | A1 | 12/2011 | Monk, IV et al. |
| 2011/0302235 | A1 | 12/2011 | Monk et al. |

OTHER PUBLICATIONS

U.S. Appl. No. 12/792,556, Non-Final Office Action mailed Jan. 9, 2012, 15 pages.
U.S. Appl. No. 12/792,556, Response filed Jul. 9, 2012 to Non-Final Office Action mailed Jan. 9, 2012, 10 pages.

* cited by examiner

200

202

PAGE REQUEST
DETECTOR

204

SESSION STATE
INFORMATION DETECTOR

206

THROUGHPUT
CALCULATOR

210

RESPONSE BUILDER

208

PAYLOAD SCANNER

212

COMMUNICATIONS
MODULE

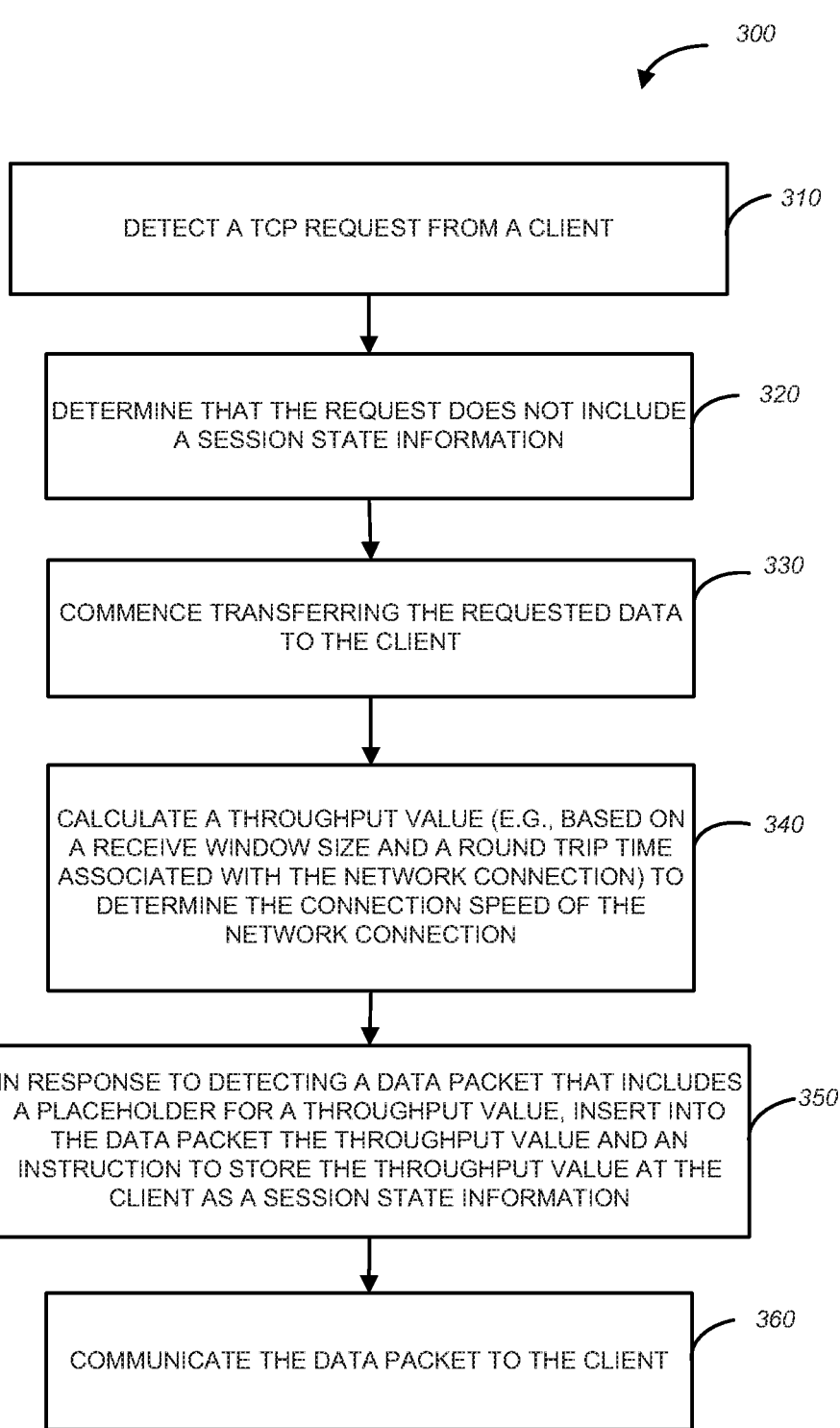

*300*

DETECT A TCP REQUEST FROM A CLIENT  — *310*

DETERMINE THAT THE REQUEST DOES NOT INCLUDE A SESSION STATE INFORMATION  — *320*

COMMENCE TRANSFERRING THE REQUESTED DATA TO THE CLIENT  — *330*

CALCULATE A THROUGHPUT VALUE (E.G., BASED ON A RECEIVE WINDOW SIZE AND A ROUND TRIP TIME ASSOCIATED WITH THE NETWORK CONNECTION) TO DETERMINE THE CONNECTION SPEED OF THE NETWORK CONNECTION  — *340*

IN RESPONSE TO DETECTING A DATA PACKET THAT INCLUDES A PLACEHOLDER FOR A THROUGHPUT VALUE, INSERT INTO THE DATA PACKET THE THROUGHPUT VALUE AND AN INSTRUCTION TO STORE THE THROUGHPUT VALUE AT THE CLIENT AS A SESSION STATE INFORMATION  — *350*

COMMUNICATE THE DATA PACKET TO THE CLIENT  — *360*

*FIG. 3*

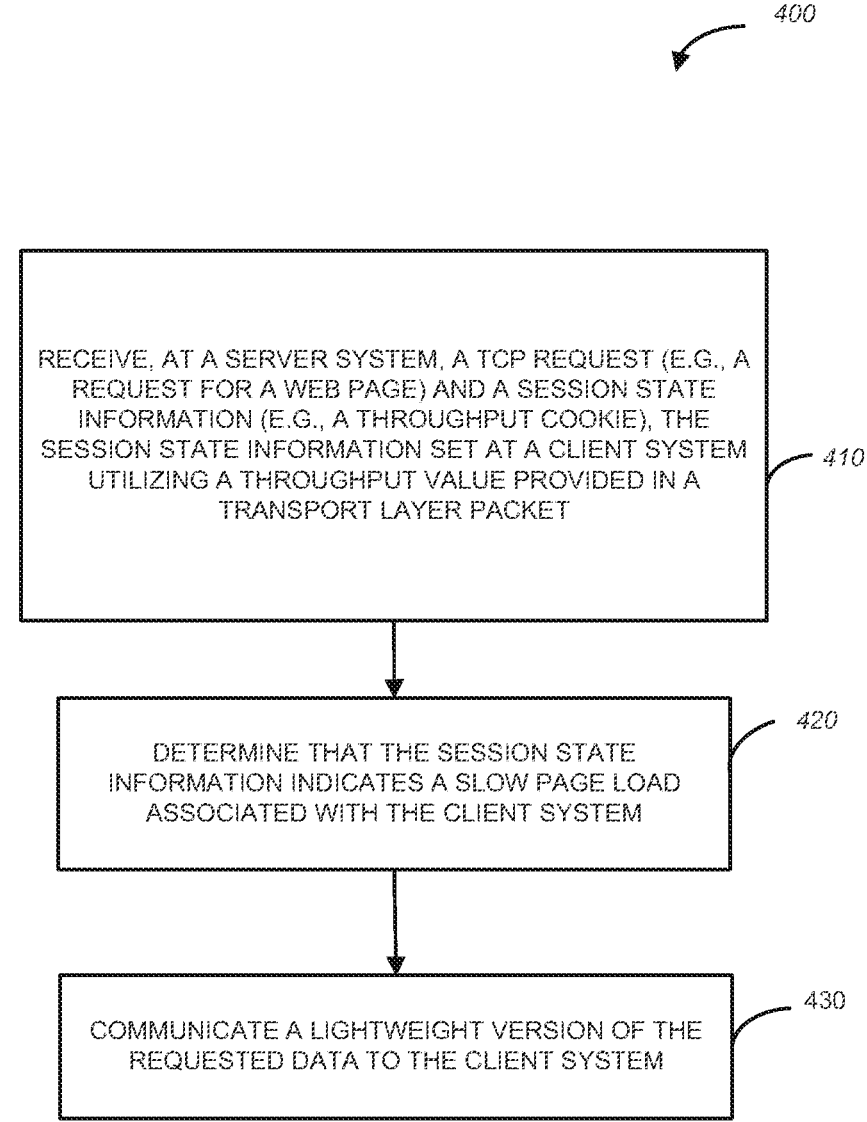

*400*

RECEIVE, AT A SERVER SYSTEM, A TCP REQUEST (E.G., A REQUEST FOR A WEB PAGE) AND A SESSION STATE INFORMATION (E.G., A THROUGHPUT COOKIE), THE SESSION STATE INFORMATION SET AT A CLIENT SYSTEM UTILIZING A THROUGHPUT VALUE PROVIDED IN A TRANSPORT LAYER PACKET *410*

DETERMINE THAT THE SESSION STATE INFORMATION INDICATES A SLOW PAGE LOAD ASSOCIATED WITH THE CLIENT SYSTEM *420*

COMMUNICATE A LIGHTWEIGHT VERSION OF THE REQUESTED DATA TO THE CLIENT SYSTEM *430*

DETECT A PAGE REQUEST COMMUNICATED FROM A CLIENT COMPUTER TO A WEB SERVER — *610*

COMMENCE A TIME-OUT PERIOD — *620*

DETERMINE THAT RENDERING OF A RICH VERSION OF THE REQUESTED PAGE HAS NOT COMMENCED AT AN EXPIRATION OF THE TIME-OUT PERIOD — *630*

CAUSE A LIGHTWEIGHT VERSION OF THE REQUESTED PAGE TO BE PROVIDED TO THE CLIENT COMPUTER — *640*

METHOD AND SYSTEM FOR DETECTING SLOW PAGE LOAD

RELATED APPLICATION

This application is a Continuation of and claims the priority benefit of U.S. application Ser. No. 18/095,106, filed Jan. 10, 2023, which is a continuation of U.S. application Ser. No. 16/989,682 filed Aug. 10, 2020, now U.S. Pat. No. 11,550,870, which is a continuation of U.S. application Ser. No. 15/236,660 filed Aug. 15, 2016, now U.S. Pat. No. 10,740,426, which is a continuation of U.S. application Ser. No. 12/792,560 filed Jun. 2, 2010, which is hereby incorporated by reference in its entirety.

TECHNICAL FIELD

This application relates to the technical fields of software and/or hardware technology and, in one example embodiment, to system and method to detect slow page load.

BACKGROUND

Web pages are electronic documents that can include textual, graphic, video, and audio content. Most Web pages are generated using the HyperText Mark-up Language (HTML), although the pages can include data encoded according to other formats, e.g., Moving Picture Experts Group (MPEG), Joint Photographic Experts Group (JPEG), Graphics Interchange Format (GIF), and so forth. The most common way to access a Web page is by using a Web browser. Typically, the pages are transferred from servers to recipient systems (the clients) using the HyperText Transfer Protocol (HTTP). HTTP is an application level protocol that is layered on top of the TCP/IP protocols.

In the Internet/intranet communications, the "effective" throughput of communication paths between servers and clients can vary greatly. The effective throughput depends on transmission rates, number of "hops." error rates, latencies, and so forth. Because servers and clients can be connected via a wide range of network technologies, the effective throughput can span several orders of magnitude. This means that a Web page that includes rich content designed for a high throughput path may not always be inappropriate for use by client systems that have slow connection to network servers over paths with much lower throughput.

Some existing systems permit the use of a specialized tag that allows an HTML-coded Web page to specify the use of two versions of a given image. The browser initially loads a low-resolution version of the image; then automatically loads a high resolution version to replace the low-resolution image.

BRIEF DESCRIPTION OF DRAWINGS

Embodiments of the present invention are illustrated by way of example and not limitation in the figures of the accompanying drawings, in which like reference numbers indicate similar elements and in which:

FIG. 3 is a flow chart of a method for determining, at a server system, a throughput value associated with the client system and providing it to the client system utilizing transport layer, in accordance with an example embodiment;

FIG. 4 is a flow chart of a method that utilizes session state information to determine that a client system is characterized by slow page load, in accordance with an example embodiment;

DETAILED DESCRIPTION

Figure 1:
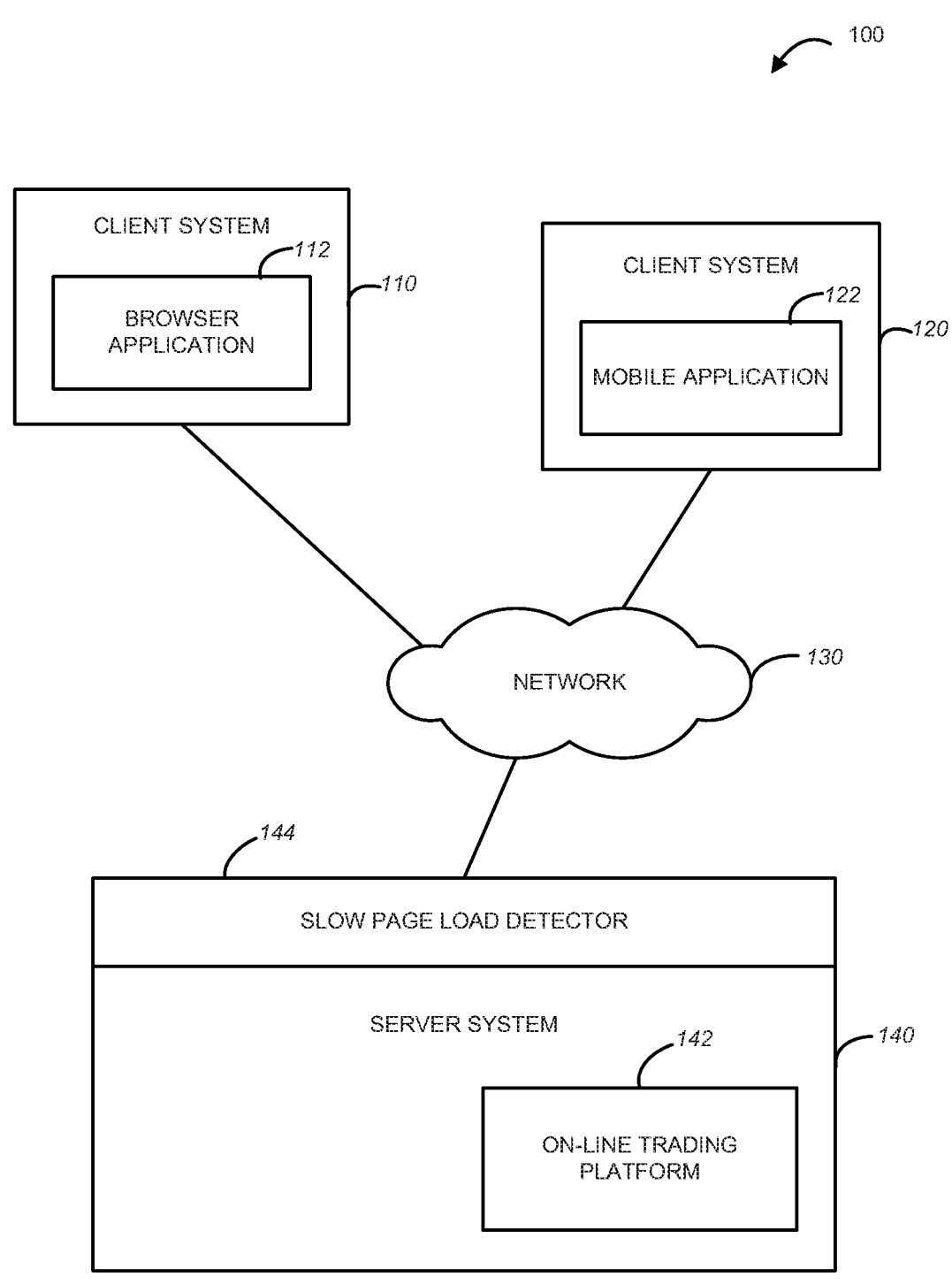
FIG. 1 is a diagrammatic representation of a network environment within which an example method and system for detecting slow page load may be implemented.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As data communicated between computer systems (e.g., web pages) are getting increasingly larger, there may still be users who access the Internet utilizing slower network connections and/or slower processing resources. Proposed is a method to identify those client systems that are characterized by slower page load and to serve them a simpler version of a web page that is not as large (e.g., that doesn't have as much client-side rich content, doesn't make as many client-side calls, etc.). Example methods and systems may be utilized beneficially to automatically detect slow connection speed or a scenario where a rich version of the requested data (e.g., a rich version of a web page) takes a long time to load, and serve the associated requesting client a lightweight version of the web page. It will be noted, that while some examples in this specification refer to a server system providing a requested web page to a browser application installed on a client, the techniques described herein may be applicable to scenarios where a client application is a mobile application, a desktop widget, etc. Also, the term "page" in the context of a slow page load may refer to a web page or any other response information that may be provided to browser application, a mobile application, a desktop widget, etc.

Consistent with one example embodiment, a client-side JavaScript™ (JS) script sets a timeout method (e.g., Set-Timeout(X)) when a web page request is communicated from the client system to a web server. If the requested page does not begin to render before the timer associated with the SetTimeout call expires, then the client-side code takes one of a variety of actions, including: (i) prompting the user to switch to a lightweight version of the requested web page, or (ii) automatically requesting a lightweight version of the requested web page. This approach, in one example embodiment, takes into consideration both the communication speed between the client system and the web server, as well as the effect of the processing resources utilized at the client system on the time that it may take to load a requested web page.

Another example approach to detecting slow page load involves using server-side code at the transport layer (e.g., TCP driver) to perform a method for determining that a client system, which is receiving an HTTP response from a provider server over TCP/IP, has a slow network connection. A client system is a ubiquitous client, e.g., a desktop computer, a mobile device, a personal digital assistant (PDA), etc. TCP uses an end-to-end flow control protocol to avoid having the sender (e.g., a web server) send data too fast for the TCP receiver (e.g., a client browser) to reliably receive and process it. For example, if a personal computer (PC) sends data to a hand-held PDA that is slowly processing received data, the PDA must regulate data flow so as to not be overwhelmed. TCP uses a sliding window flow control protocol. In each TCP segment (also referred to as a TCP data packet), the receiving host specifies in the receiver window field the amount of additional data (in bytes) that it is able to buffer for the connection. The sending host can send only up to that amount of data before it must wait for an acknowledgment and window update from the receiving host (client). The inventive concept, in one example embodiment, involves using the receiver window size (RWIN) and the round trip time (RTT), as measured at the server, to determine the connection speed of a network connection connecting the client to the server. Once the connection speed is determined, the connection speed may be communicated to the client to enable the client to prompt the user to switch to a lightweight version of the requested page or pages. At the server, the connection speed (that may be expressed by a throughput value) may be encoded and included into an outgoing data packet by manipulating placeholder bytes present in the payload of the data packet. When the encoded throughput value is received at the client, the client-side code (e.g., Javascript), can cause the client to present the user with the option to switch to a lightweight version of the requested web page, or can cause the client to automatically request a lightweight version of the page.

An example method and system for detecting slow page load may be implemented in the context of a network environment 100 illustrated in FIG. 1. As shown in FIG. 1, the network environment 100 may include client systems (or clients) 110 and 120 and a server system (or server) 140. The server system 140, in one example embodiment, may host an on-line trading platform 142. The client system 110 may run a browser application 112, while a client system 120 may be a mobile device and may run a mobile application 122. The client systems 110 and 120 may have access to the server system 140 via a communications network 130. The communications network 130 may be a public network (e.g., the Internet, a wireless network, etc.) or a private network (e.g., a local area network (LAN), a wide area network (WAN), Intranet, etc.).

The client system 110 may utilize the browser application 112 to obtain web pages (e.g., web pages related to the on-line trading platform 142) from the server system 140. The browser application 112 running on the client 110 may execute client-side code (e.g. Javascript) to start a timer at the moment it detects a web page response, use the timer to determine that the requested web page has not fully loaded after a predetermined period of time, and cause a lightweight version of the requested web page to be provided from the server 140. Such client-side code may be provided to the client 110 from the server 140. The server system 140 may host a system (a slow page load detector 144) configured to determine that a client requesting a web page should be served a lightweight version of the requested web page because the client may either have slow or insufficient processing resources (e.g., a slow Javascript interpreter) or a slow network connection with the server system 140. It will be noted that client-side code (e.g. Javascript) for causing the associated browser to react to a slow page load may be used independent from the slow page load detector 144 provided at the server 140. An example server-side system for detecting slow page load may be described with reference to FIG. 2.

Figure 2:
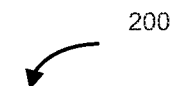
FIG. 2 is block diagram of a system for determining, at a server system, a throughput value associated with a client system and providing it to the client system, in accordance with one example embodiment.

FIG. 2 is block diagram of a system 200 for determining, at a server system, a throughput value associated with the client system and providing it to the client system, in accordance with one example embodiment. As shown in FIG. 2, the system 200 includes a page request detector 202, a session state information detector 204, a throughput calculator 206, a payload scanner 208, a response builder 210, and a communications module 212.

The page request detector 202 may be configured to receive, at a server system, a request for a web page from a client system. The session state information detector 204 may be configured to determine that the request for the web page does not include session state information. The session state information detector 204 may also be configured to trigger the monitoring of incoming ACK data packets from the client system for the duration of the current TCP connection. The monitoring may be performed by the throughput calculator 206. ACK (or an acknowledgement message) is a data packet message used in TCP communications to acknowledge receipt of a data packet. The throughput calculator 206 may be configured to calculate a throughput value associated with the network connection between the client system and the server system utilizing information (e.g., the RWIN value and the RTT value) obtained from the incoming ACK data packets. The payload scanner 208 may be configured to determine that a data packet to be sent in response to the request for the web page includes a placeholder for a throughput value in the data payload of the packet. In one embodiment, such a placeholder is included in the last data packet associated with the requested web page. For example, a data packet may be determined to be the last data packet if the payload of the data packet includes a Javascript call (e.g., expressed by the name of a Javascript function) and a set of placeholder bytes (e.g., '0e00'). The session state information detector 204, the throughput calculator 206, and the payload scanner 208 may be collectively referred to as a data packet pattern analyzer.

The response builder 210 may be configured to build an updated data packet by including, in the data packet that has a placeholder for a throughput value, the throughput value and an instruction (e.g., a Javascript call) to store the throughput value on the client as session state information (e.g., browser cookie). The communications module 202 may be configured to communicate the updated data packet to the client system. An example method performed by the system 200 may be described with reference to FIG. 3.

FIG. 3 is a flow chart of a method 300 for determining, at a server system, a throughput value associated with the client system and providing it to the client system utilizing transport layer, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the page request detector 202 of FIG. 2 receives, at the server system 140 of FIG. 1, a TCP request for from the client system 110 of FIG. 1. The TCP request may be a request for a web page or other information usable by, e.g., a web browser, a mobile application or a desktop widget. The session state information detector 204 of FIG. 2 determines that the request for the web page does not include session state information, at operation 320. In an example where the request is from a browser application installed on the client system 110, the session state information may be in the form of a browser cookie (termed a throughput cookie). The communications module 212 commences the sending of the requested data (e.g., the rich version of the requested web page) at operation 330. In the response, (e.g., in the HTTP response to the request for the web page,) a value may be set to indicate that the throughput calculator 206 of FIG. 2 (that may also be referred to as a transport layer bandwidth detector) is to be activated to measure connection speed associated with the network connection between a client and a server. At operation 340, the throughput calculator 206 of FIG. 2 calculates a throughput value associated with a network connection between the client system 110 and the server system 140 (e.g., based on the RWIN value and the RTT value determined from analyzing the TCP ACK packets received from the client). The payload scanner 208 of FIG. 2 identifies a data packet that includes a placeholder for a throughput value (that can be the last data packet to be sent to the client system 110 in response to a request for a web page). For example, the payload scanner 208 determines that a TCP data packet includes the pattern "writeCookielet('ebay',tput','0e00') </script>" in the data payload and concludes that the throughput value can be inserted into this data packet. At operation 350, the response builder 210 of FIG. 2 builds an updated data packet by including, in the data packet, the throughput value and an instruction to store the throughput value on the client as session state information. For example, the placeholder bytes ('0e00') in the TCP data packet are replaced with the throughput value calculated by throughput calculator 206. The checksum for the modified data packet is recomputed and the communications module 202 of FIG. 2 communicates the updated data packet to the client system at operation 360.

FIG. 4 is a flow chart of a method 400 that utilizes a browser cookie to determine that a client system is characterized by slow page load, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

At operation 410, the page request detector 202 of FIG. 2 receives, at the server system 140 of FIG. 1, a TCP request from the client system 110 of FIG. 1. The request includes session state information (e.g., in the form of a browser cookie) that was set at the client. At operation 420, it is determined that the session state information indicates a slow page load associated with the client system 110. In response, at operation 430, the communications module 212 of FIG. 2 sends a lightweight version of the requested data to the client system 110.

Figure 5:
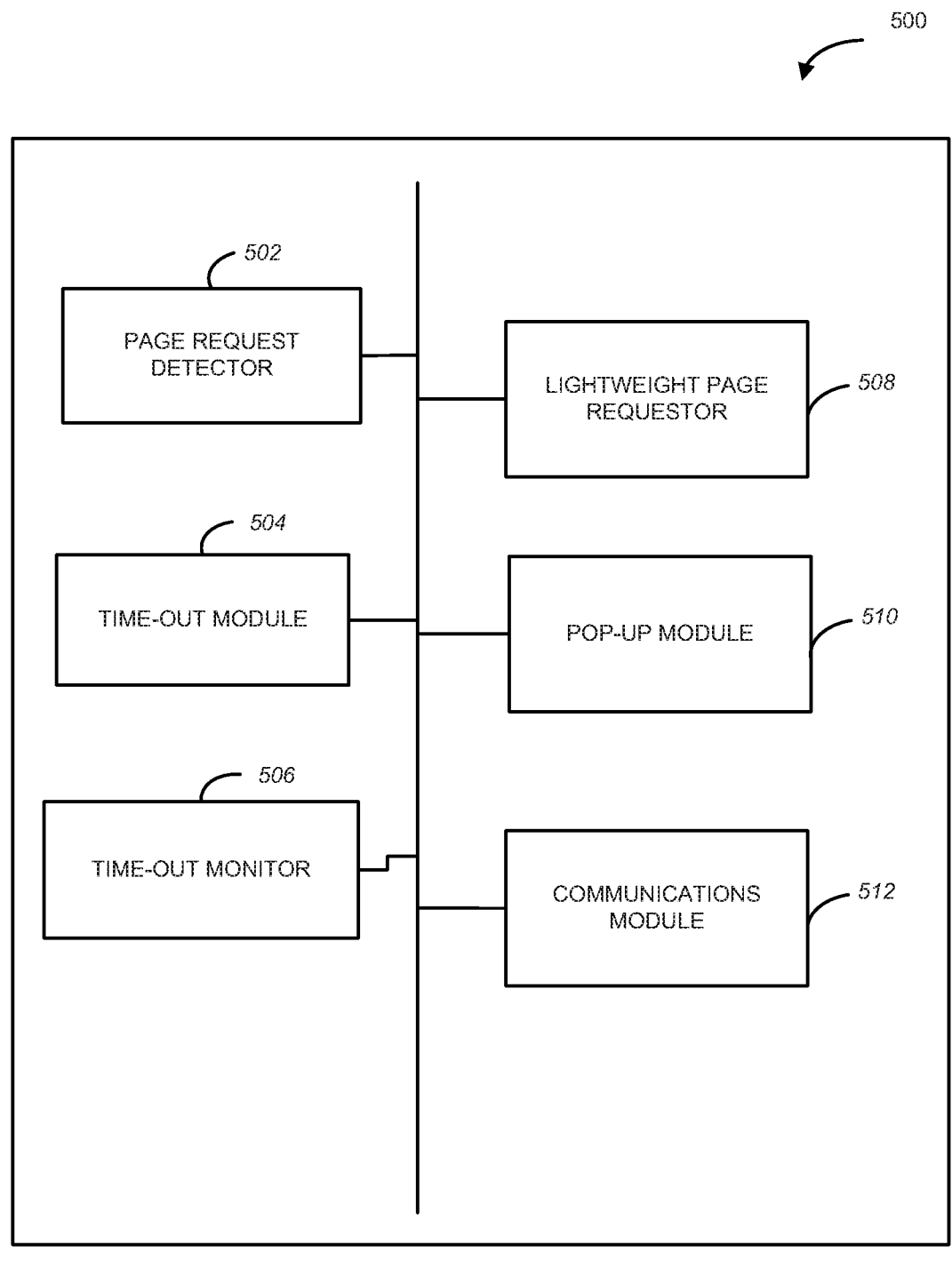
FIG. 5 is a block diagram of a system for detecting slow page load that may be provided at a client system, in accordance with an example embodiment.

As mentioned above, slow page load may also be detected at a client system by establishing a time-out period for the rendering of the requested web page. FIG. 5 is block diagram of a system 500 for detecting slow page load that may be provided at a client system, in accordance with an example embodiment. In one example embodiment, the system 500 comprises a page request detector 502, a time-out module 504, a time-out monitor 506, and a lightweight page requestor 508. These modules may be provided at the client system 110, e.g., in the form of one or more JS scripts. The page request detector 502 may be configured to detect a request for a web page communicated from the client system that hosts the system 500 to a web server. The requested web page may be associated with a rich version (e.g., including rich content, client-side JS calls, etc.) and a lightweight version (e.g., a plain HTML file). The time-out module 504 may be configured to commence a time-out period in response to a request for a web page. The time-out module 504 cooperates with the time-out monitor 506 that may be configured to determine that rendering of a rich version of the requested web page has not commenced at an expiration of the time-out period. The lightweight page requestor 508 may be configured to cause a lightweight version of the requested page to be provided to the client system 110 when the time-out monitor 506 determines that the rendering of a rich version of the requested web page has not commenced at an expiration of the time-out period.

The system 500 may also include a pop-up module 510 and a communications module 510. The pop-up module 510 may be configured to activate a pop-up window that displays a recommendation to a user to request a lightweight version of the requested web page. Alternatively, the lightweight page requestor 508 may automatically request from the web server a lightweight version of the requested web page. The communications module 512 may be configured to receive the requested web page (e.g., a lightweight or a rich version of the web page). Example operations performed by the system 500 may be described with reference to FIG. 6.

Figure 6:
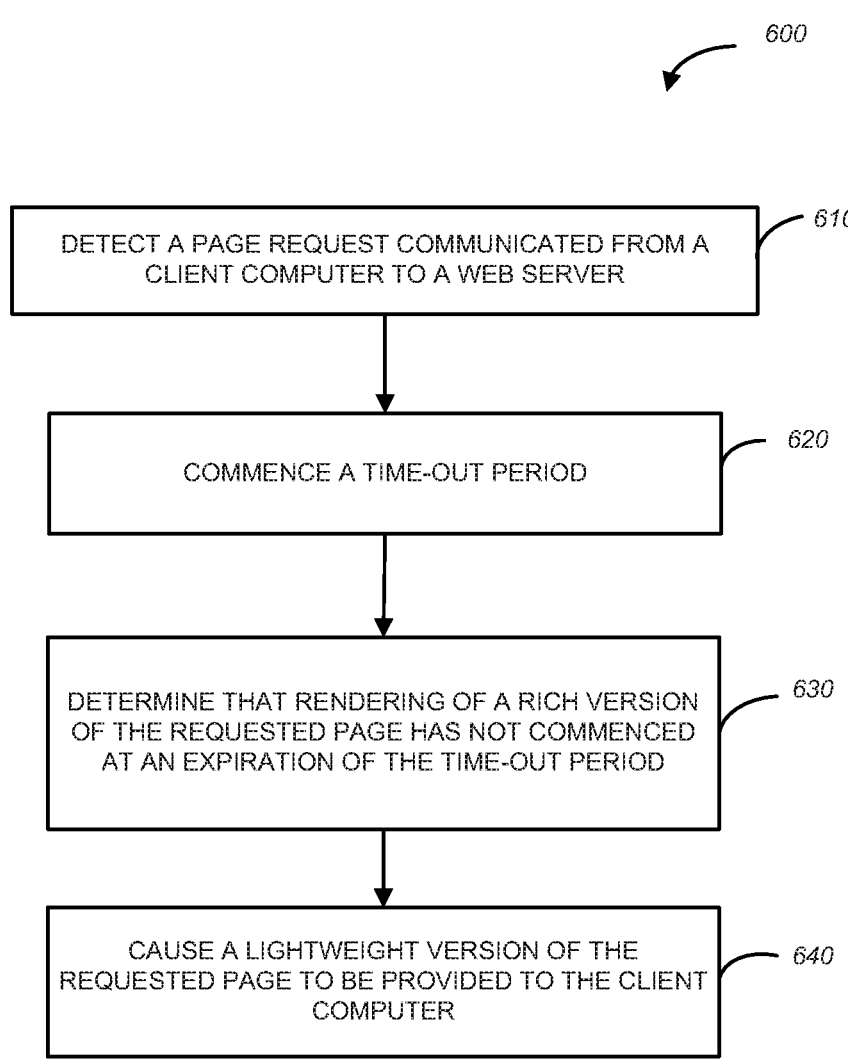
FIG. 6 is a flow chart of a method that utilizes client-side JavaScript™ script to detect slow page load, in accordance with an example embodiment.

FIG. 6 is a flow chart of a method 600 that utilizes a system implemented by a client-side JS script to detect slow page load, in accordance with an example embodiment. The client-side JS script may be provided to a client system from a web server. The method 600 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the client system 110 of FIG. 1 and, specifically, at the system 500 shown in FIG. 5.

As shown in FIG. 6, the method 600 commences at operation 610, when the page request detector 502 detects that a request for a web page has been made to a web server. At operation 620, the time-out module 504 commences a time-out period in response to the detected request for the web page. The time-out module 504 determines, at operation 630, that rendering of a rich version of the requested web page has not commenced at an expiration of the time-out period. The lightweight page requestor 508 causes a lightweight version of the requested page to be provided to the client system 110 at operation 640.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 7:
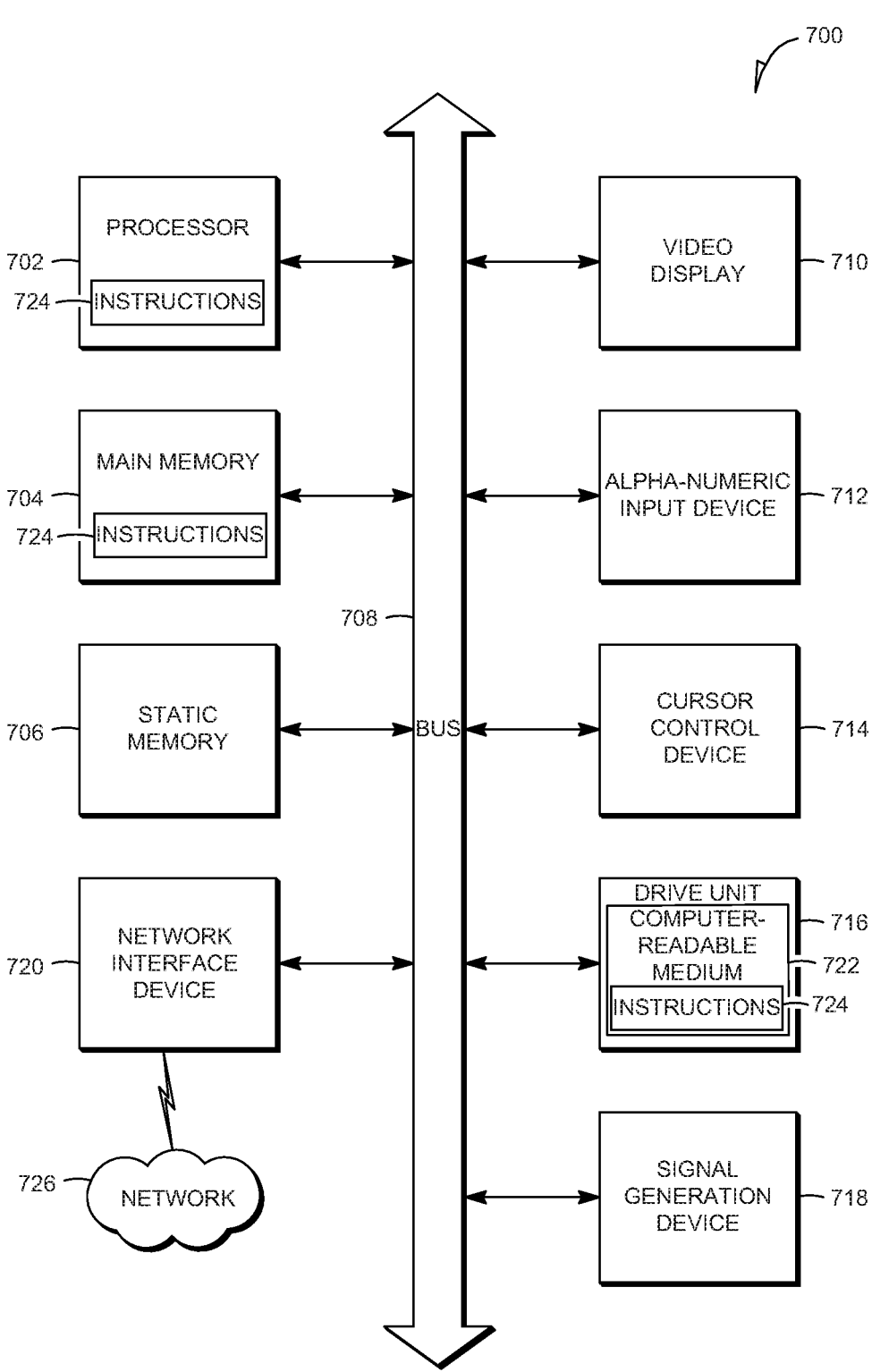
FIG. 7 is a diagrammatic representation of an example machine in the form of a computer system within which a set of instructions, for causing the machine to perform any one or more of the methodologies discussed herein, may be executed.

FIG. 7 shows a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system for detecting slow page load have been described. The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A client computer system, comprising:
one or more processors; and
a non-transitory computer-readable medium having stored thereon instructions that are executable by the one or more processors to cause the client computer system to perform operations comprising:
detecting that a particular request for a first version of a web page has been sent to a content server system;
initiating a timer countdown in response to the detecting;
receiving a particular data packet from the content server system;
in response to an expiration of the timer countdown, determining that content associated with the first version has not been rendered;
based on the determining, sending a different request for a second version of the web page; and
sending a response to the particular data packet, wherein the response includes a request to determine connection speed.

2. The client computer system of claim 1, further comprising a display, and wherein sending the different request includes:
displaying, on the display, a prompt to suggesting a switch to the second version; and
sending the different request in response to receiving a confirmation to the prompt.

3. The client computer system of claim 1, wherein the first version includes rich content associated with the web page, and wherein the second version is a lightweight version of the web page.

4. The client computer system of claim 1, wherein sending the response to the particular data packet occurs prior to sending the different request for the second version of the web page.

5. The client computer system of claim 1, wherein the operations further include:
prior to the expiration of the timer countdown, receiving a different data packet from the content server system, wherein the different data packet has been modified to include a connection speed in addition to a portion of data for the first version of the web page.

6. The client computer system of claim 5, wherein sending the different request includes:
determining that the connection speed between the client computer system and the content server system does not satisfy a threshold; and based on determining the threshold is not satisfied, sending the different request.

7. The client computer system of claim 1, wherein sending the different request includes:
determining that computing resources of the client computer system are insufficient for loading the first version of the web page; and
based on determining the computing resources are insufficient, sending the different request.

8. The client computer system of claim 1, wherein the operations include JavaScript received by the client computer system from the content server system.

9. A method, comprising:
detecting, by a process executing on a client computer system, that a particular request for a first version of a web page has been sent to a content server system;
in response to detecting the particular request, commencing, by the process, a time-out period;
receiving, by the process, a particular data packet from the content server system, wherein the particular data packet has been modified to include a connection speed in addition to a portion of data for the first version of the web page;
in response to an expiration of the time-out period, determining, by the process, that content associated with the first version has not begun rendering; and
in response to the determining, sending, by the process, a different request for a second version of the web page.

10. The method of claim 9, further comprising:
receiving, by the process, a different data packet from the content server system; and
sending, by the process, a response to the different data packet, wherein the response includes a request to determine connection speed.

11. The method of claim 10, wherein sending response to the different data packet includes sending, by the process, the response based on the expiration of the time-out period.

12. The method of claim 9, wherein the particular data packet is received prior to the expiration of the time-out period.

13. The method of claim 12, wherein sending the different request includes:
determining, by the process, that the connection speed between the client computer system and the content server system does not satisfy a threshold; and
based on determining the threshold is not satisfied, sending, by the process, the different request.

14. The method of claim 9, wherein sending the different request includes:
determining, by the process, that computing resources of the client computer system are insufficient for loading the first version of the web page; and
based on determining the computing resources are insufficient, sending, by the process, the different request.

15. A non-transitory computer readable medium having instructions stored thereon that are executable by a computer system to cause the computer system to perform operations comprising:
sending, to a content server system, a first request for a first version of a web page;
detecting, by a process executing on the computer system, the sending of the first request;
in response to the detecting, starting, by the process, a time-out period;
receiving a particular data packet from the content server system, wherein the particular data packet has been modified to include a connection speed in addition to a portion of data for the first version of the web page;

in response to an expiration of the time-out period, determining, by the process, that rendering of content associated with the first version has not commenced; and in response to the determining, sending a different request for a second version of the web page.

16. The non-transitory computer readable medium of claim 15, wherein the operations further comprise:

receiving a different data packet from the content server system; and sending a response to the different data packet, wherein the response includes a request to determine connection speed.

17. The non-transitory computer readable medium of claim 16, wherein the different data packet is associated with the second version of the web page.

18. The non-transitory computer readable medium of claim 15, wherein the particular data packet is received prior to the expiration of the time-out period.

19. The non-transitory computer readable medium of claim 15, wherein to send the different request, the operations further comprise:

determining that the connection speed between the computer system and the content server system does not satisfy a threshold; and based on determining the threshold is not satisfied, sending the different request.

20. The non-transitory computer readable medium of claim 15, wherein to send the different request, the operations further comprise:

determining that computing resources of the computer system are insufficient for loading the first version of the web page; and based on determining the computing resources are insufficient, sending the different request.

* * * * *